US008218197B2

(12) United States Patent
Chiba et al.

(10) Patent No.: US 8,218,197 B2
(45) Date of Patent: Jul. 10, 2012

(54) IMAGE FORMING APPARATUS HAVING INTERACTIVE DISPLAY THAT RECEIVES OPERATION INPUT FOR PROCESS CONDITIONS ABOUT A FINISHING PROCESS

(75) Inventors: Kunihisa Chiba, Izumi (JP); Yoshikazu Kondoh, Sakai (JP); Hirotaka Kodama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 697 days.

(21) Appl. No.: 12/249,395

(22) Filed: Oct. 10, 2008

(65) Prior Publication Data

US 2009/0122326 A1   May 14, 2009

(30) Foreign Application Priority Data

Nov. 9, 2007   (JP) ................................. 2007-291888

(51) Int. Cl.
*H04N 1/60* (2006.01)
*G06F 3/12* (2006.01)
(52) U.S. Cl. ........................................ 358/1.9; 358/1.15
(58) Field of Classification Search .......................... None
See application file for complete search history.

(56) References Cited

U.S. PATENT DOCUMENTS

| 5,596,656 | A  | * | 1/1997 | Goldberg ........................ 382/186 |
| 6,535,787 | B1 | * | 3/2003 | Inamasu et al. ................ 700/180 |
| 2006/0039707 | A1 | * | 2/2006 | Mima .............................. 399/23 |
| 2007/0057426 | A1 | * | 3/2007 | Tao et al. ..................... 270/58.09 |
| 2008/0016455 | A1 | * | 1/2008 | Furukawa et al. ............. 715/770 |

FOREIGN PATENT DOCUMENTS

| JP | 07-014750 U   | 3/1995 |
| JP | 2002-84387 A  | 3/2002 |
| JP | 2005-246683 A | 9/2005 |
| JP | 2006-041947 A | 2/2006 |
| JP | 2007-78726 A  | 3/2007 |

\* cited by examiner

*Primary Examiner* — Twyler Haskins
*Assistant Examiner* — Christopher D Wait
(74) *Attorney, Agent, or Firm* — Birch, Stewart, Kolasch & Birch, LLP

(57) ABSTRACT

When image data is obtained through a network from a document reading portion or a PC etc., a main control portion displays, through a display control portion, a document icon in a document icon area on a display portion. A user drags and drops the document icon on an output image operation area with a touch pen or the like, and the main control portion displays the specified document icon on the area. Moreover, when specification of a paper area, a position of a punch hole, a position of stapling, and the like is performed with the touch pen or the like, the main control portion determines whether or not setting is possible and outputs specified data to an image formation control portion and a post-process control portion.

8 Claims, 10 Drawing Sheets

↓ COMPLETE DOCUMENT SCAN

↓ DRAG AND DROP DOCUMENT ICON

↓ SPECIFY PAPER AREA

↓ SPECIFY PUNCHING/STAPLING

OUTPUT CONDITIONS TABLE

| INPUT CONDITIONS | | | OUTPUT CONDITIONS | |
|---|---|---|---|---|
| Xp,Yp: AREA6 | Xs,Ys: AREA7 | ① Xmin−Xmax LENGTH > Ymin−Ymax LENGTH | ①−1 | LATERAL PAPER FEEDING, ROTATE IMAGE CLOCKWISE BY 90 DEGREES |
| Xp,Yp: AREA2 | Xs,Ys: AREA3 | ① Xmin−Xmax LENGTH > Ymin−Ymax LENGTH | ①−2 | LATERAL PAPER FEEDING, ROTATE IMAGE COUNTERCLOCKWISE BY 90 DEGREES |
| Xp,Yp: AREA8 | Xs,Ys: AREA1 | ② Xmin−Xmax LENGTH < Ymin−Ymax LENGTH | ②−1 | LATERAL PAPER FEEDING, NO IMAGE ROTATION |
| Xp,Yp: AREA4 | Xs,Ys: AREA5 | ② Xmin−Xmax LENGTH < Ymin−Ymax LENGTH | ②−2 | LATERAL PAPER FEEDING, ROTATE IMAGE CLOCKWISE BY 180 DEGREES |
| Xp,Yp: AREA8 | Xs,Ys: AREA1 | ① Xmin−Xmax LENGTH > Ymin−Ymax LENGTH | ③−1 | VERTICAL PAPER FEEDING, NO IMAGE ROTATION |
| Xp,Yp: AREA4 | Xs,Ys: AREA5 | ① Xmin−Xmax LENGTH > Ymin−Ymax LENGTH | ③−2 | VERTICAL PAPER FEEDING, ROTATE IMAGE CLOCKWISE BY 180 DEGREES |
| Xp,Yp: AREA6 | Xs,Ys: AREA7 | ② Xmin−Xmax LENGTH < Ymin−Ymax LENGTH | ④−1 | VERTICAL PAPER FEEDING, ROTATE IMAGE CLOCKWISE BY 90 DEGREES |
| Xp,Yp: AREA2 | Xs,Ys: AREA3 | ② Xmin−Xmax LENGTH < Ymin−Ymax LENGTH | ④−2 | VERTICAL PAPER FEEDING, ROTATE IMAGE COUNTERCLOCKWISE BY 90 DEGREES |

FIG.11A    2in1
LATERAL DIVISION
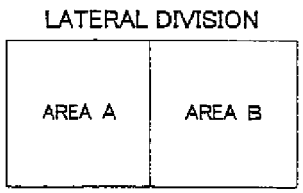
FIG.11B    2in1
VERTICAL DIVISION
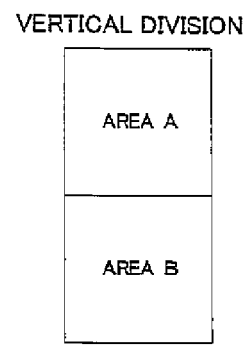
FIG.11C    3in1
LATERAL DIVISION
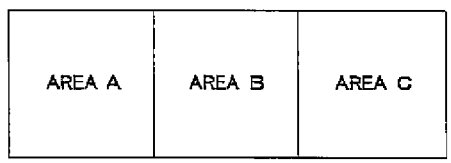
FIG.11D    3in1
VERTICAL DIVISION
FIG.11E    4in1
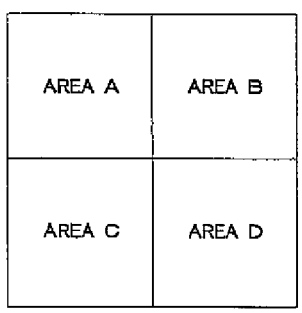
FIG.11F    5in1、6in1
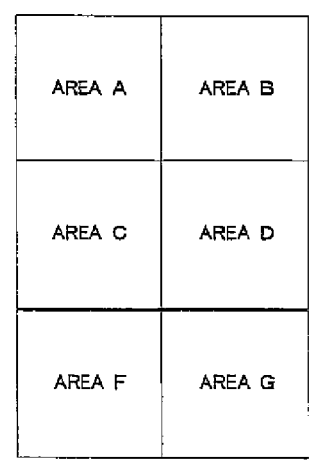

IMAGE FORMING APPARATUS HAVING INTERACTIVE DISPLAY THAT RECEIVES OPERATION INPUT FOR PROCESS CONDITIONS ABOUT A FINISHING PROCESS

This Nonprovisional application claims priority under 35 U.S.C. §119(a) on Patent Application No. 2007-291888 filed in Japan on Nov. 9, 2007, the entire contents of which are hereby incorporated by reference.

BACKGROUND OF THE INVENTION

1. Field of the Invention

The present invention relates to a technology for setting conditions for a finishing process in an image forming apparatus.

2. Description of the Prior Art

Conventionally, as represented by a multifunctional peripheral, an image forming apparatus having various functions such as a facsimile, a printer, a scanner and the like has been developed.

Furthermore, the image forming apparatus is provided with functions relating to various finishing processes such as a printing mode that a plurality of (N) images are combined and synthesized over a recording paper (hereinafter, abbreviated as "N in 1"); a stapling process (hereinafter, abbreviated sometimes also as "stapling"); and a punching process (hereinafter, abbreviated sometimes also as "punching").

However, although user's request is more satisfied as the various functions are provided, operations become more complicated due to the increased functions.

In order to facilitate selection of functions by the user, a technology for displaying selectable functions as icons on an operational panel of the image forming apparatus and displaying a finished image of a printed material according to the selected function is disclosed (for example, Patent Document 1: Japanese Patent Application Laid-Open No. 2007-78726).

However, in the technology of the Patent Document 1, although selection of the functions is easy, only a predetermined setting can be selected as to processing conditions, and for example, as to the processing conditions such as a stapling position and a punching position, the user is not able to specify a desired position to customize.

In addition, in the technology of the Patent Document 1, even when utilizing an N in 1 function, the user is not able to freely set positions of images on a recording paper, nor set a rate of sizes of images with respect to the recording paper.

SUMMARY OF THE INVENTION

The present invention has been devised in view of the above problems, it is therefore an object of the present invention to provide an image forming apparatus wherein a user is able to set process conditions for a finishing process function of a printed material easily and intuitively.

In view of such circumstances, an image forming apparatus according to the first aspect of the present invention includes: an image data acquiring portion for acquiring image data; a display portion for displaying the image data in a thumbnail form as a document icon; an operation receiving portion for receiving operation input for process conditions about a finishing process; a storage portion for storing the image data and data of the process conditions; and a control portion for performing control for the finishing process involving output of the image data, and is characterized in that, the operation receiving portion is provided on a display surface of the display portion, and the control portion causes the display portion to display the document icon, and performs setting for the process conditions by input information acquired from the operation receiving portion.

Furthermore, an image forming apparatus according to the second aspect of the present invention is characterized in that, input information acquired from the operation receiving portion is coordinate information of a continuous track, and the control portion performs determination as to whether or not the track forms a closed area, and in a case where determination result shows the closed area, when the closed area includes a display area of the document icon, the coordinate information is set in the storage portion as information for specifying a paper area.

Furthermore, an image forming apparatus according to the third aspect of the present invention is characterized in that, the control portion stores, in the storage portion, identification information of the document icon within the paper area, the number and a position of the document icon, as processing conditions of the finishing process for synthesizing and printing a plurality of the image data on a recording paper.

Furthermore, an image forming apparatus according to the fourth aspect of the present invention is characterized in that, the control portion divides the paper area into the number of the document icon, and when each divided paper area is provided with the document icon correspondingly, arrangement of the image data in the paper area is decided and set so as to be in the divided paper area.

Furthermore, an image forming apparatus according to the fifth aspect of the present invention is characterized in that, input information acquired from the operation receiving portion is coordinate information of a continuous track, and the control portion performs determination as to whether or not the track forms a closed area, in a case where determination result shows the closed area, when the closed area includes no display area of the document icon and when the closed area has a size smaller than a predetermined size, the coordinate information is set in the storage portion as information for specifying a position of a punching process.

Furthermore, an image forming apparatus according to the sixth aspect of the present invention is characterized in that, input information acquired from the operation receiving portion is coordinate information of a continuous track, and the control portion performs determination as to whether or not the track forms a closed area, in a case where determination result does not show the closed area, when the track has a length shorter than a predetermined length, the coordinate information is set in the storage portion as information for specifying a position of a stapling process.

Furthermore, an image forming apparatus according to the seventh aspect of the present invention is characterized in that, the display portion is provided with a touch panel as the operation receiving portion, the touch panel includes: a document icon area for displaying the acquired image data as a thumbnail; and an output image operation area for displaying the document icon dragged and dropped from the document icon area and receiving operation input with a touch pen, and the control portion identifies a coordinate by handwriting input on the output image operation area to set the process conditions.

Furthermore, an image forming apparatus according to the eighth aspect of the present invention is characterized in that, input information acquired from the operation receiving portion is coordinate information of a continuous track, the control portion performs determination as to whether or not the track forms a closed area, in a case where determination result shows the closed area, when the closed area includes no display area of the document icon and when the closed area has a size smaller than a predetermined size, the coordinate information is set in the storage portion as information for specifying a position of a punching process, and in a case where determination result does not show the closed area, when the track has a length shorter than a predetermined length, the coordinate information is set in the storage portion as information for specifying a position of a stapling process, the display portion is provided with a touch panel as the operation receiving portion, the touch panel includes: a document icon area for displaying the acquired image data as a thumbnail; and an output image operation area for displaying the document icon dragged and dropped from the document icon area and receiving operation input with a touch pen; the control portion identifies a coordinate by handwriting input on the output image operation area to set the process conditions, the storage portion includes a conditions setting table for verifying the process conditions, and the control portion, when setting of the punching process and/or the stapling process is performed, determines whether or not setting of the process conditions is possible, by referring to the conditions setting table with respect to a position coordinate of the punching process and/or a position coordinate of the stapling process.

Furthermore, an image forming apparatus according to the ninth aspect of the present invention includes: an image forming portion for obtaining input of the image data to perform printing of an image; and a post-processing portion for performing a post process on a printed recording paper, is characterized in that, the conditions setting table sets a direction of the image data corresponding to the position of the punching process and the position of the stapling process and a feeding direction of the recording paper, and the control portion obtains data of the process conditions from the storage portion, outputs, to the image forming portion, information of the image data to be arranged on the recording paper and information of the direction of the image data and the feeding direction of the recording paper, and outputs, to the post-processing portion, information of the punching process and/or the stapling process, and thereby performs control of the finishing process.

Furthermore, an image forming apparatus according to the tenth aspect of the present invention is characterized in that, the display portion includes a setting confirmation area for displaying setting information, and the setting confirmation area displays contents of setting for the process conditions received from the operation receiving portion as a message.

According to the present invention, since setting for processing conditions of a finishing process is performed using a document icon displayed on the display portion of the image forming apparatus according to the present invention, it is possible for a user to perform setting with an easy operation.

Furthermore, according to the present invention, it is possible, by performing an input operation of encircling the document icon displayed on the display portion, to specify a paper area, and it is also possible to freely set a ratio of a size of image data to a sheet.

Furthermore, according to the present invention, concerning setting in N in 1, it is possible for a user to set selection and arrangement of image data to be printed on a recording paper easily and optionally.

Furthermore, according to the present invention, concerning setting in a punching process, it is possible for a user to set a position of a punch hole on a recording paper easily and optionally.

Furthermore, according to the present invention, concerning setting in a stapling process, it is possible for a user to set a position of stapling on a recording paper easily and optionally.

Furthermore, according to the present invention, since it is possible to perform setting for various finishing conditions by a track of input with a touch pen on the touch panel, thus making it possible to perform intuitive input operation and to improve operability.

Furthermore, according to the present invention, before setting conditions for punching and stapling, it is possible to perform determination of the possibility thereof appropriately by providing the conditions table.

Furthermore, according to the present invention, it is possible to set a rotating direction of image data corresponding to positions of punching and stapling and a paper feeding direction, and to appropriately give an instruction of finishing setting to processing portions that perform each process of image formation and post processing.

Furthermore, according to the present invention, it is possible to display the process conditions for the finishing process as a message on the display portion, thus making it possible to give a warning of setting to a user.

BRIEF DESCRIPTION OF THE DRAWINGS

FIG. 10 shows an example of an output conditions table that is referred to at the time of setting a punching position and a stapling position in the image forming apparatus according to the present invention; and FIG. 11 is a view showing an example of setting in N in 1 in the image forming apparatus according to the present invention.

DESCRIPTION OF THE PREFERRED EMBODIMENTS

The embodiments of the present invention will hereinafter be described with reference to the illustrative examples.

Figure 1:
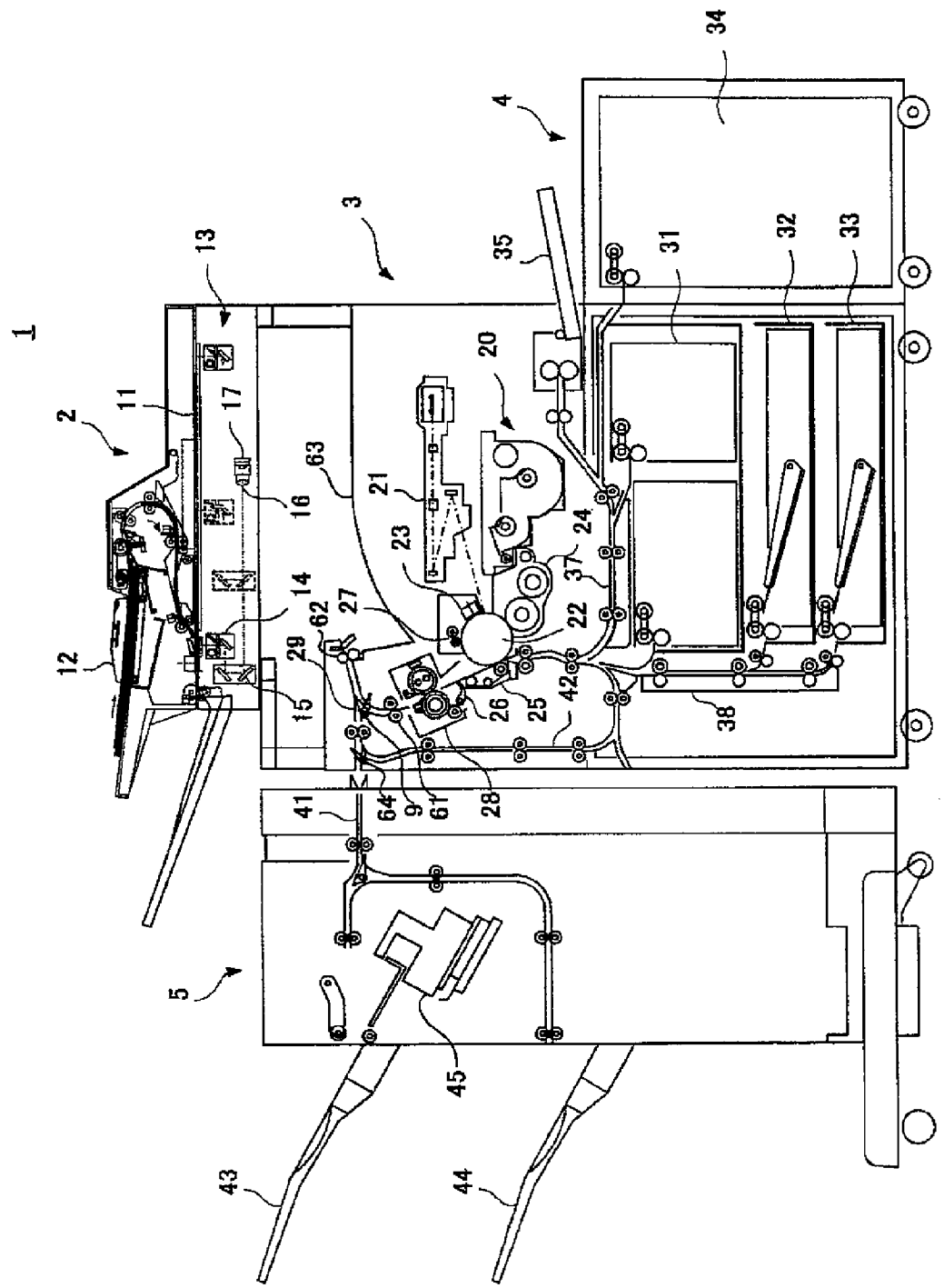
FIG. 1 is a sectional view showing an embodiment of an image forming apparatus according to the present invention.

FIG. 1 is a sectional view showing an embodiment of a multifunctional peripheral (an image forming apparatus) 1.

As shown in FIG. 1, an image reading portion 2 is configured by a document table 11 made of transparent glass, a recirculating automatic document feeder (hereinafter, referred to as "RADF") 12 for automatically supplying a document onto the document table 11, and a document image reading unit i.e., a scanner unit 13 for scanning and reading an image of a document placed on the document table 11.

The RADF 12 is a known apparatus having a plurality of documents set in a predetermined document tray at a time and automatically delivering the set documents one by one onto the document table 11 to be read by the scanner unit 13. The RADF 12 is configured by a conveying path for one-side documents, a conveying path for two-side documents, conveying path switching means, and the like, such that the scanner unit 13 is caused to read one side or both sides of the document depending on a selection of a user.

The scanner unit 13 is configured by a lamp reflector assembly that exposes a document surface, a first scanning unit 14 equipped with a first reflecting mirror for guiding a reflected light image from a document to a Charge Coupled Device (hereinafter referred to as "CCD") 17 for conversion into electric image signals, a second scanning unit 15 equipped with second and third reflecting mirrors, and an optical lens body 16 for focusing the reflected light image on the CCD 17. Scanning control is carried out such that the first scanning unit 14 travels from left to right along the document table 11 at a constant velocity V and that the second scanning unit 15 travels in the same direction at a velocity of V/2.

This makes it possible that the image reading portion 2, with an associated operation of the RADF 12 and the scanner unit 13, sequentially places documents to be read on the document table 11, moves the scanner unit 13 along an undersurface of the document table 11, and sequentially focuses, onto the CCD 17 for each line, an image of the document placed on the document table 11 to read the document image.

The image data acquired by reading the document image with the scanner unit 13 is subjected to various processes and temporarily stored in a memory, and after the image data is output from the memory to the image forming portion 3 in response to an output instruction and is reproduced as a visible image on a photoconductor drum 22, the image is transferred onto a sheet to form a toner image.

The image forming portion 3 includes a laser scanning unit (hereinafter, referred to as "LSU") 21 and an electrophotographic process portion 20 for forming an image.

The LSU 21 includes a semiconductor laser that emits laser light depending on image data read from the memory or image data transferred from an external device such as a personal computer, a polygon mirror that deflects the laser light at a constant angular velocity, an f-θ lens that corrects the laser light deflected at the constant angular velocity such that the photoconductor drum 22 of the electrophotographic process portion 20 is scanned at a constant velocity.

The electrophotographic process portion 20 includes a charger 23, a developing apparatus 24, a transferring apparatus 25, a peeling apparatus 26, a cleaning apparatus 27, and a charge erasing device (not shown) arranged around the photoconductor drum 22 in accordance with a known aspect, and also includes a fixing apparatus 28 disposed downstream side of the photoconductor drum 22.

The paper feed portion 4 includes, for example as shown in FIG. 1, first to third cassettes 31 to 33 and a manual feed tray 35. The first cassette 31 is a tandem tray for housing first and second trays and allows the both trays to be pulled out from the apparatus main body at the same time. The second cassette 32 and the third cassette 33 house a third tray and a fourth tray, respectively. That is, in the present embodiment, the three cassettes (31 to 33) house the four trays. Paper feeding and conveying paths 37 and 38 include paper feed rollers, conveying rollers, and registration rollers for conveying sheets from the paper feed portion 4 to a transfer position between the photoconductor drum 22 and the transferring apparatus 25.

Sheets are stacked and housed in the four trays within the first to third cassettes 31 to 33 in the paper feed portion 4 for each size, and when a user selects a cassette or a tray housing the sheets of the desired size, the sheets are sent out one-by-one from the top of the sheet stack in the tray and are sequentially conveyed through the conveying paths of the paper feeding and conveying paths 37 and 38 to the electrophotographic process portion 20.

A paper discharging path 29 is disposed on the downstream side in the sheet conveying direction from the fixing apparatus 28, and the paper discharging path 29 is branched into a paper discharging and conveying path 41 in a post-processing apparatus 5 and a paper re-feeding and conveying path 42 for both sides copying.

In the LSU 21 and the electrophotographic process portion 20, the image data read from the memory is formed as an electrostatic latent image on a surface of the photoconductor drum 22 by scanning a laser beam with the LSU 21, a toner image turned into a visible image by toner of the developing apparatus 24 is electrostatically transferred onto a surface of a sheet conveyed from the paper feed portion 4 by the transferring apparatus 25, and is fixed by the fixing apparatus 28.

The sheet having the image formed thereon in this way is sent from the fixing apparatus 28 to the post-processing apparatus 5, or is selectively conveyed to the paper re-feeding and conveying path 42 for both sides copying.

The sheet sent to the post-processing apparatus 5 is subjected to a predetermined process such as a sort or stapling process and a punching process, if necessary, and is stacked in a first discharge tray 43 or a second discharge tray 44.

Moreover, the sheet sent to the paper re-feeding and conveying path 42 for both sides copying is reversed and conveyed to the electrophotographic process portion 20 again, and an image is formed on the backside of the sheet, which is discharged after the image is fixed.

The image forming apparatus 1 shown in FIG. 1 includes the first to third cassettes 31 to 33 and the manual feed tray 35 in the image forming apparatus main body, and as an option, a large-capacity cassette 34 is further added as a fifth tray. An upwardly biased elevator is included within the large-capacity cassette 34, sheets are accumulated in this elevator, a top sheet is in contact with the paper feed roller, and the sheet is isolated and sent out by rotating the paper feed roller and enters into the paper feeding and conveying path 37 of the image forming apparatus main body. The large-capacity cassette 34 is a large-capacity tray, and therefore, stores standard sheets of the most frequently used size, for example, A4 size.

The post-processing apparatus 5 is disposed to the left of the image forming apparatus 1 in FIG. 1, and includes the first discharge tray 43 and the second discharge tray 44. For example, the second discharge tray 44 is a discharging portion that receives sheets having images formed thereon discharged from the image forming portion 3 by a received/discharged paper conveying path 41 provided at an upper side of the post-processing apparatus 5 to discharge the sheets as they are. The first discharge tray 43 is a discharging portion that discharges sheets subjected to a post-process by post-processing means 45 capable of executing post-processes such as stapling and punching. It may be configured such that when no sort process is specified, the first discharge tray 43 is used, alternatively, in the case of a sort process, the second discharge tray 44 is used.

In the case of two-side printing, a sheet having an image recorded thereon is conveyed through the fixing apparatus 28 and then upwardly by a conveying roller 61 and passes through a switch gate 9, and thereafter the sheet is once discharged toward a stack tray 63 by a reverse roller 62. In this case, the sheet is not completely discharged and the reverse roller 62 is reversed while the sheet is kept nipped. Thereafter, the switch gate 9 is switched from a state of the solid line (upward) to a state of the broken line (downward) shown in the figure, while another switch gate 64 is in the upward (broken line) state, the sheet passes through the paper re-feeding and conveying path 42, and is supplied to the image forming apparatus 3 again, followed by printing on the backside.

Moreover, when the sheet is reversed for the post-process, another switch gate 64 is in the downward (solid line) state and the sheet is conveyed from the paper re-feeding and conveying path 42 to the post-processing apparatus 5 to execute the post-process.

Figure 2:
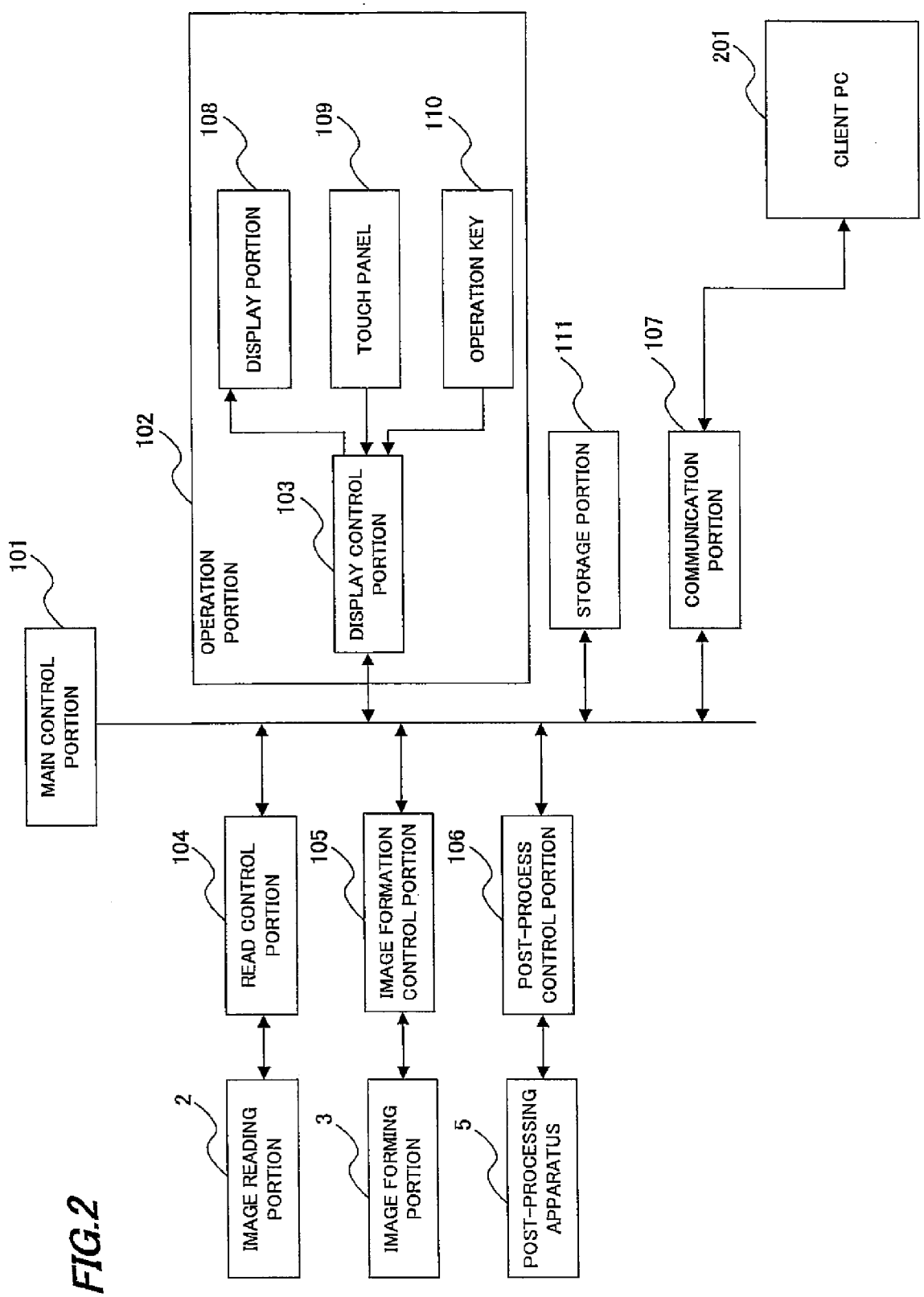
FIG. 2 is a functional block diagram schematically showing the structure of a characteristic portion of the present invention.

FIG. 2 is a functional block diagram schematically showing the structure of a characteristic portion of the image forming apparatus 1.

A main control portion 101 controls entire operations of the image forming apparatus 1.

In FIG. 2, the main control portion 101 controls a display control portion 103 of an operation portion 102, a read control portion 104, an image formation control portion 105, a post-process control portion 106, and a communication portion 107.

The operation portion 102 corresponds to a finishing process conditions setting portion, and is configured by the display control portion 103, a display portion 108, a touch panel 109, and an operation key 110.

Note that, the finishing process includes an N in 1 process, a stapling process, a punching process, and the like.

The display control portion 103 among them controls, for example, the display portion 108 that is a display such as a liquid crystal panel, the touch panel 109, the operation key 110 that is a key switch for operations, and the like.

The touch panel 109 is disposed on a display surface of the display portion 108, and has a function of outputting a coordinate of a contact position to the display control portion 103.

The read control portion 104 controls the image reading portion 2 to read a document image.

The image formation control portion 105 controls the image forming portion 3, and the post-process control portion 104 controls the post-processing apparatus 5, respectively, to generate a printed material.

The communication portion 107 performs network communication through a LAN with a client PC (Personal Computer) 201 and the like.

When having a function of a touch panel, the client PC is also able to function as the finishing process conditions setting portion.

Moreover, the image forming apparatus 1 includes a storage portion 111 that stores image data read from the read control portion 104 or setting data relating to a finishing process from the main control portion 101.

Figure 3:
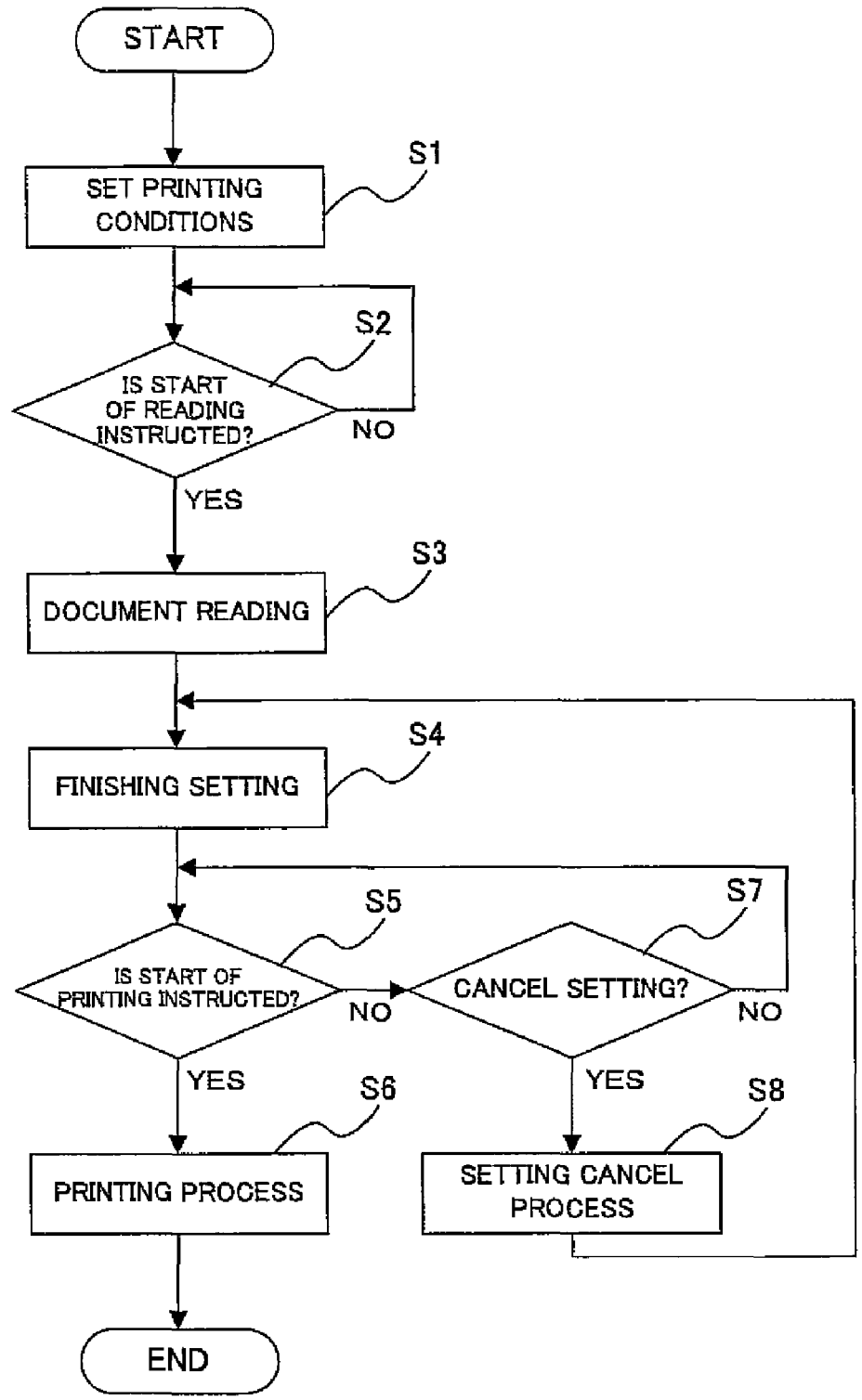
FIG. 3 is a flowchart showing a flow of an image forming process performed in a main control portion of the image forming apparatus according to the present invention.

FIG. 3 is a flowchart showing an overall flow of an image forming process performed in the main control portion 101.

First, with starting an operation by user's depressing of the operation key 110 etc., and the like, as a trigger, the main control portion 101 receives, through the display control portion 103, operation input for printing conditions such as the number of copies to be printed and a magnification (S1). The main control portion 101 repeatedly determines whether or not a start button for starting reading is depressed (S2), when depression of the start button is detected (in the case of "YES" at step S2), a control signal is transmitted to the read control portion 104 and the read control portion 104 causes the image reading portion 2 to read a document, and then image data is stored in the storage portion 111 (S3).

Subsequently, with control by the display control portion 103 that has received an instruction signal from the main control portion 101, the display portion 108 displays a screen for receiving operation input to set process conditions relating to the finishing process (hereinafter, referred to also as "finishing setting") That is, the display portion 108 receives the operation input using the touch panel 109, and when the operation input is performed, the display control portion 103 receives input setting data (finishing setting data) from the touch panel 109 and the storage portion 111 stores the finishing setting data therein (S4).

Note that, examples of the process conditions relating to the finishing process (hereinafter, referred to also as "finishing conditions") include a method for synthesizing a plurality of (N) images within a single page in the N in 1 process (arrangement of images, a ratio of image sizes, and the like), a stapling position in the stapling process, a punching position in the punching process, and the like.

Note that, although it has been described such that operation input for finishing setting is received after a document is read, the operation input of finishing setting may be received while receiving printing conditions such as the number of copies.

Then, the main control portion 101 determines, through the display control portion 103, whether or not a start button for starting printing is depressed (S5) and when depression of the start button is detected (in the case of "YES" at step S5), printing conditions and finishing conditions that have been set, and image data are read from the storage portion 111 and printing is executed based on them (S6), followed by completion of the present process.

For example, a timer is included in the main control portion 101 or the like to clock time, and when the depression of the start button for starting printing is not detected within a fixed time (in the case of "NO" at S5), for example, by switching the screen of the display portion 108 with control of the main control portion 101, an operation instruction to cancel the setting is received (S7), when input not to cancel is performed (in the case of "NO" at S7), the procedure proceeds back to S5 to perform determination, and when an instruction to cancel is given (in the case of "YES" at S7), the input setting data of the finishing conditions is canceled (S8) to go back to step S4 again and receive operation input for finishing setting.

Note that, the main control portion 101 may obtain image data through the network from the client PC 201, instead of reading a document. The main control portion 101 may be also configured so as to receive operation input for finishing setting from the display portion 108, the touch panel 109, and the like provided in the client PC 201.

Figure 4:
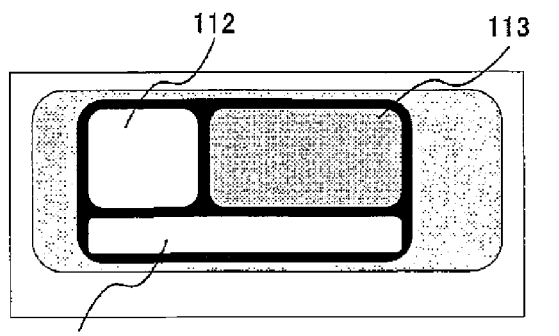
FIG. 4 shows an exemplary display of a display portion for performing operation input for finishing setting in the image forming apparatus according to the present invention.
Figure 4:
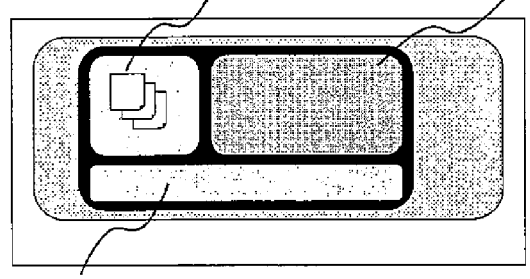
Figure 4:
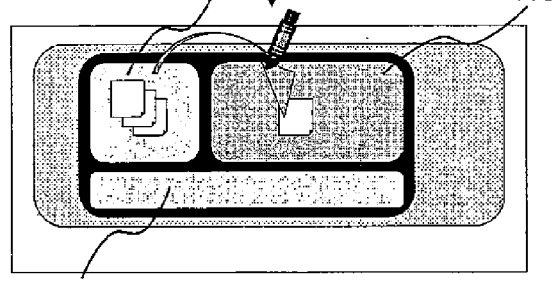
Figure 4:
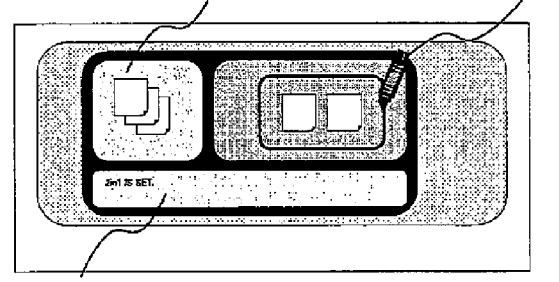
Figure 4:
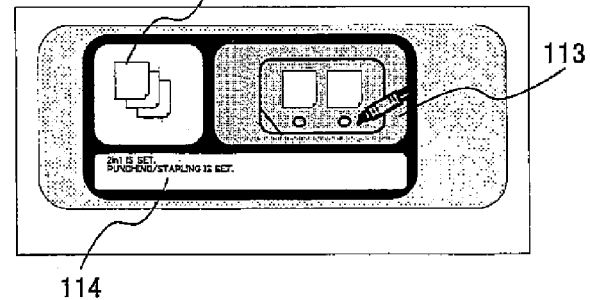

FIG. 4 shows exemplary display of the display portion 108 for performing operation input for finishing setting at S4 above. The operation input for finishing setting will hereinafter be described with reference to the drawings.

FIG. 4A shows an exemplary display of the display portion 108 before starting document reading.

The display to receive operation input for finishing setting on the display portion 108 is roughly classified into, for example, a document icon area 112, an output image operation area 113, and a setting confirmation area 114.

The document icon area 112 is an area where obtained image data is displayed as an icon. A document is read by the image reading portion 2, or image data obtained from the client PC 201 through the communication portion 107 is stored in the storage portion 111, and thereafter, as shown in FIG. 4B, the main control portion 101 causes, through the display control portion 103, document icons (thumbnails) of the image data to be displayed on the document icon area 112 of the display portion 108.

As shown in FIG. 4C, the output image operation area 113 is an area where it is possible that the document icon is dragged and dropped from the document icon area 112 to be arranged thereon, and that an operator performs handwriting input with a touch pen and the like into the icon, as shown in FIGS. 49 and 4E, to perform finishing setting. FIG. 4D shows a state where a plurality of document icons are arranged on the output image operation area 113 and specification is made so that the document icons are encircled with the touch pen to thereby specify an outer edge of a paper (a paper area). FIG. 4E shows a state where a stapling position is specified with the oblique line and a punching position is specified with two circles in the specified paper area.

Moreover, the setting confirmation area 114 is an area where a message is displayed so that set contents can be confirmed by a user. For example, as shown in FIGS. 4D and 4E, finishing setting specified on the output image operation area 113 is displayed on the setting confirmation area 114.

Next, the finishing setting at S4 of FIG. 3 will be described in detail.

Figure 5:
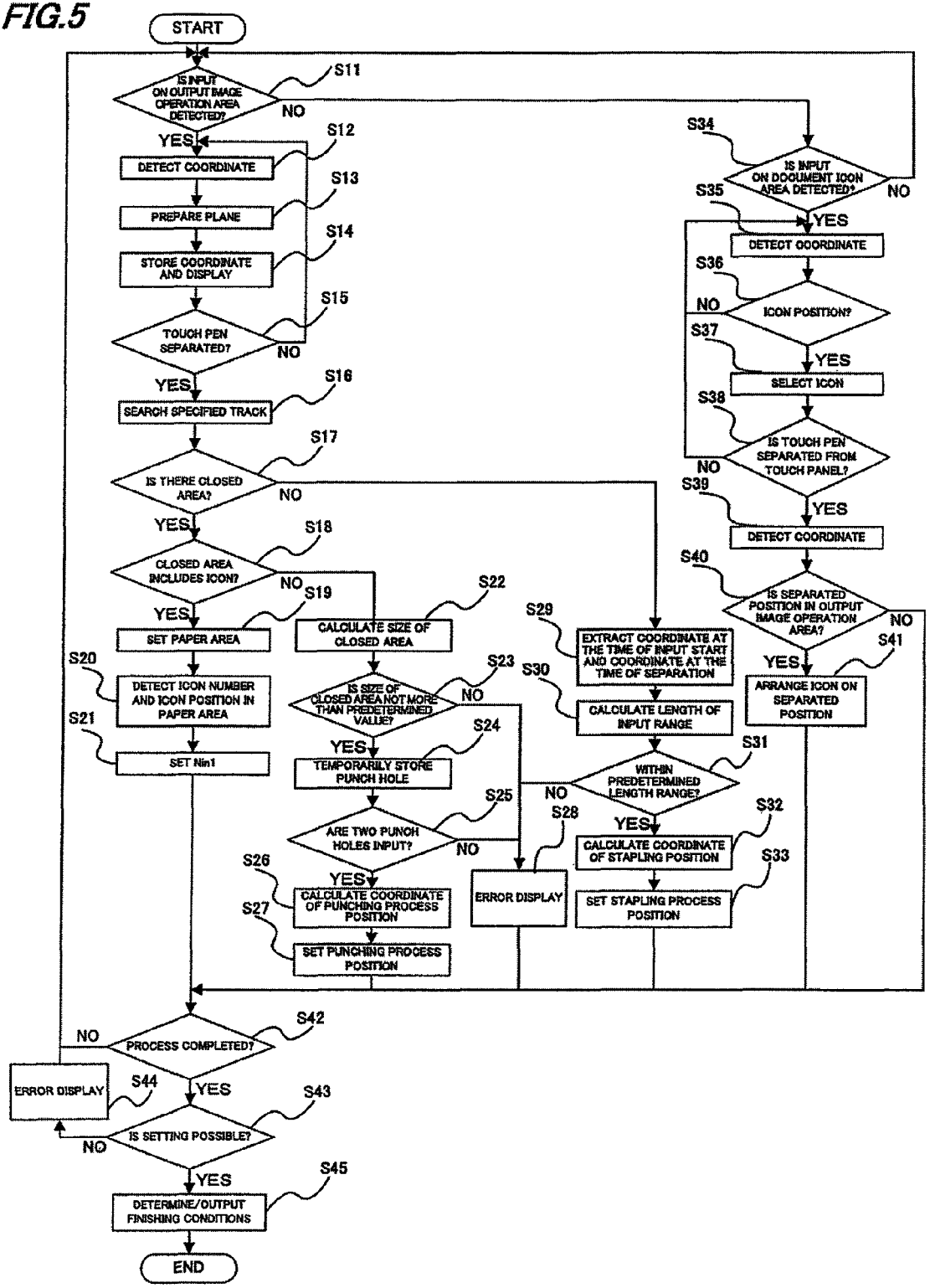
FIG. 5 is a flowchart showing a flow of a process of finishing setting in the image forming apparatus according to the present invention.

FIG. 5 is a flowchart showing a flow of a process of finishing setting.

The main control portion 101 determines, through the display control portion 103, whether or not input by the touch pen and the like is performed on the output image operation area 113 in the touch panel 109 (S11), when the input on the output image operation area 113 is detected (in the case of "YES" at S1), a touched coordinate is detected (S12) and a memory plane for recording the coordinate point in contact with the touch pen is prepared in the storage portion 111 (S13). The main control portion 101 records, on the plane, specified coordinates since a touch with the touch pen on the output image operation area 113 is detected until the touch pen is separated from the area. When the touch pen is separated from the area once and input with the touch pen is detected again, the main control portion 101 prepares another plane in the storage portion 111. In this way, operations with the touch pen are recorded individually. While recording the specified coordinates by the touch pen on the plane, the main control portion 101 controls the display control portion 103 to display a track of the touch on the output image operation area 113 of the display portion 108 (S14), and determines whether or not the touch pen is separated from the touch panel 109 (S15).

When it is determined that the touch pen is separated from the touch panel 109 (in the case of "YES" at S15), the main control portion 101 searches the track on the plane specified with the touch pen to set a value showing that it has been specified (S16). For example, as an initial value, a coordinate is set at "0", and an identification number or an identification mark such as "1" is set for a coordinate of the specified track to thereby distinguish from other coordinates.

Subsequently, the main control portion 101 determines whether or not the track recorded on the plane is an encircled area (a closed area) (S17). In the case of the closed area (in the case of "YES" at S17), the main control portion 101 sets values showing that specification has been made for all coordinates within the closed area on the plane to determine whether or not a coordinate of a document icon is included in the closed area (S18).

When a document icon is included in the closed area (in the case of "YES" at S18), the closed area is set as a paper area (an outside form of a recording paper) (S19).

Subsequently, the main control portion 101 detects the number of icons and positions of the icons in the paper area (S20), and sets the number of icons in N in 1 (N), coordinate information about an area occupied by the document icons in the paper area, and the like in the storage portion 111 (S21), which is displayed on the setting confirmation area 114. The N in 1 refers to that a plurality of (N) images are synthesized and output in a single page, as described above. In the case of 2 in 1, two sheets of documents are printed on a single page.

With the configuration as described above, when setting N in 1, a user is able to set arrangement of images in a recording paper and a ratio of sizes of images easily and optionally.

When no icon is included in the closed area (in the case of "NO" at S18), there is a possibility of a position of a punch hole being specified, and therefore whether or not a position of a punch hole being specified is determined.

First, the main control portion 101 calculates a size of the specified closed area. The size of the closed area is calculated by a distance obtained by, for example, a formula of (Xmax, Ymax)−(Xmin,Ymin), wherein, Xmax is a maximum X coordinate, Ymax is a maximum Y coordinate, Xmin is a minimum X coordinate, and Ymin is a minimum Y coordinate, in the closed area (S22). The main control portion 101 determines whether or not the size of the closed area is not more than a predetermined value (S23). Note that, the predetermined value is previously set in the storage portion 111 as a value in a range showing a possibility of a specified position of a punch hole. In the case of not more than the predetermined value, the main control portion 101 determines as a punch hole.

The main control portion 101 temporarily stores, in the storage portion 111, a middle coordinate between (Xmax, Ymax) and (Xmin,Ymin) as a coordinate of a punch hole (Xp1,Yp1) or the like (S24). Subsequently, the main control portion 101 determines whether or not two coordinates are set as the punch hole (S25). When two coordinates are set as a punch hole (in the case of "YES" at S25), the main control portion 101 calculates a middle position (Xp2,Yp2) between two punch holes as a punching process position (S26) to store in the storage portion 111 (S27), and then displays, on the setting confirmation area 114, that setting of the punch holes is made.

With the configuration as described above, when setting a punching process, a user is able to set positions of a punch hole on a recording paper easily and optionally.

Moreover, when the size of the closed area is not less than the predetermined value (in the case of "NO" at S23), or when the number of the closed areas determined as a punch hole is not two (in the case of "NO" at S25), the main control portion 101 performs error display on the display portion 108 through the display control portion 103 (S28). In this way, erroneous input is prevented.

When there is no closed area (in the case of "NO" at S17), there is a possibility of a stapling position being specified, and therefore a coordinate (x1,y1) where the touch pen was touched on the touch panel at first and a coordinate (x2,y2) where the touch pen is separated from the touch panel are extracted from the plane (S29) to calculate a distance therebetween by a formula of (x1,y1)−(x2,y2) (S30).

Subsequently, the main control portion 101 determines whether or not the distance calculated at S30 falls within a predetermined length range (S31). Note that, the predetermined value is previously set in the storage portion 111 as a range value showing a possibility of specification of stapling. When the calculated distance falls within the predetermined length range (in the case of "YES" at S31), the main control portion 101 calculates a middle coordinate between (x1,y1) and (x2, y2) as a set coordinate (Xs,Ys) for the stapling position (S32) and stores in the storage portion 111, and then displays, on the setting confirmation area 114, that setting of stapling is made.

With the structure as described above, when setting a stapling process, a user is able to set a stapling position on a recording paper easily and optionally.

Alternatively, when the value being not within the predetermined length range (in the case of "NO" at S31) the main control portion 101 performs error display, through the display control portion 103, on the display portion 108 (S28). Thus, only in the case of within the predetermined length range, it is accepted as a stapling position to thereby prevent erroneous operation.

Alternatively, when input with the touch pen into the output image operation area 113 in the touch panel 109 is not detected (in the case of "NO" at S11), the main control portion 101 detects, through the display control portion 103, input with the touch pen into the document icon area 112 in the touch panel 109 (S34).

When the input with the touch pen into the document icon area 112 is detected (in the case of "YES" at S34), the main control portion 101 detects an input coordinate (S35) and determines whether or not the input coordinate is included in a display area of the document icon (S36). When the input coordinate in the document icon area 112 is included in the display area of the document icon (in the case of "YES" at S36), the main control portion 101 selects the icon (S37).

Subsequently, when detecting that the touch pen is separated from the touchpanel 109 (S38), the main control portion 101 detects a coordinate where the touch pen is separated (S39) and determines whether or not the separated position is in the output image operation area 113 (S40). When the position where the touch pen is separated is in the output image operation area 113 (in the case of "YES" at S40), a coordinate where the touch pen is separated is stored in the storage portion 111 as a display position of the document icon, to display the document icon on the output image operation area 113 (S41).

With the configuration as described above, it is possible that an icon displayed on the document icon area 112 is dragged and dropped on the output image operation area 113 by an operation with the touch pen or the like so that a user is able to perform finishing setting by handwriting input or the like.

When the input with the touch pen into the document icon area 112 is not detected at S34 (in the case of "NO" at S34), or when the position where the touch pen is separated is not in the output image operation area 113 at S40 (in the case of "NO" at S40), the procedure proceeds back to S11 to perform determination.

Alternatively, when the input coordinate in the document icon area 112 is not included in the display area of the document icon at S36 (in the case of "NO" at S36), or when it is not detected that the touch pen is separated from the touch panel 109 as S38 (in the case of "NO" at S38), the procedure proceeds back to S35.

Moreover, the main control portion 101 determines whether or not a button for completing operation input of finishing setting or the like is depressed and an instruction to complete the process is given (S42), and when it is determined that the instruction to complete the process is given (in the case of "YES" at S42), finishing setting data is read from the storage portion 111 to determine whether or not specified finishing conditions such as hole punching and stapling can be set by comparing the finishing setting data with an output conditions table, which will be described below (S43). When determining that these finishing conditions can not be set (in the case of "NO" at S43), the main control portion 101 performs error display (S44) and the procedure proceeds back to S11.

Alternatively, when a screen to confirm whether or not the process is to be completed is displayed on the display portion 108 and a button for not completing the process or the like is depressed by a user (in the case of "NO" at S42), the procedure proceeds back to S11.

Note that, when a screen to confirm whether or not the process is completed is not displayed and there is only a process completion button, the process at S42 is a process for determining repeatedly whether or not the button is depressed.

When it is determined that the specified finishing conditions such as hole punching and stapling can be set (in the case of "YES" at S43), the main control portion 101 further obtains data relating to a paper feeding direction and an image rotating direction from the output conditions table to determine about these conditions. Then, based on the paper area and the arrangement of documents in N in 1, the punching position, the stapling position, and the like, that have been specified, the main control portion 101 outputs execution/non-execution of the punch and stapling processes and finishing setting data involving these processes to the post-process control portion 106, and outputs execution/non-execution of the N in 1 process, finishing setting data involving the process, and data about an image direction and a paper feeding direction to the image formation control portion 105 (S45), followed by completion of the present finishing setting process.

With the configuration as described above, it is possible that, at the time of execution of the finishing conditions including hole punching and stapling, whether or not the execution is possible is determined appropriately, and instructions of finishing setting are given for each processing portion that performs steps of image formation and post processing.

[Determination and Setting of Punching Process and Stapling Process]

The setting of the punching process position at S27, the setting of the stapling process position at S33, the determination as to whether or not setting of the finishing process is possible at S43, and the determination of the finishing conditions at S45 will hereinafter be described in detail.

Figure 6:
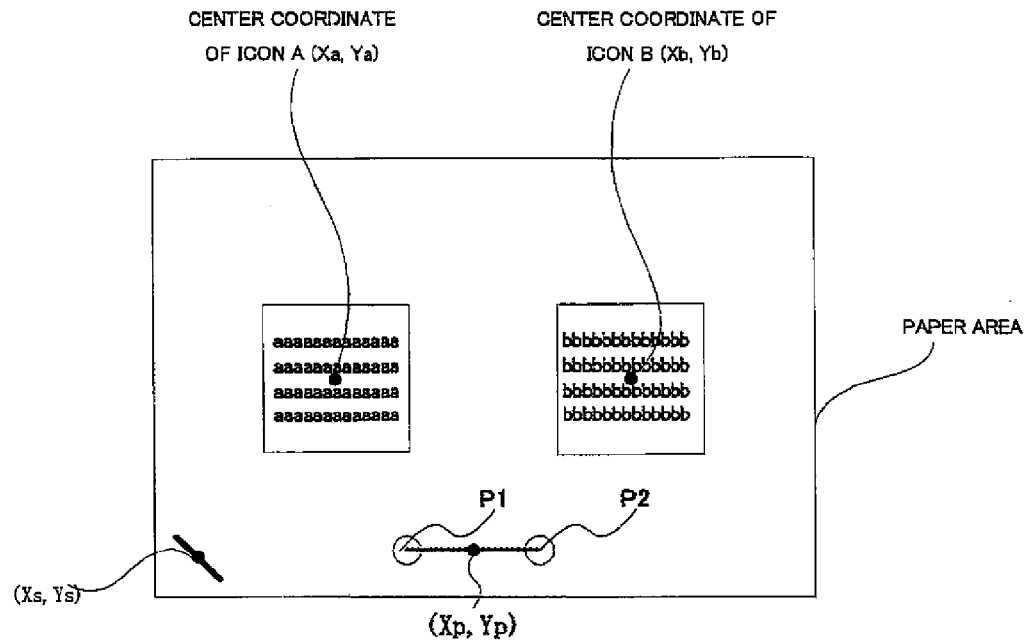
FIG. 6 is a an illustrative view showing setting of a position of a finishing process in the image forming apparatus according to the present invention.

FIG. 6 is an illustrative view showing setting of a paper area and arrangement of documents in an N in 1 process, a stapling process position, and a punching process position.

As illustrated in S27, the coordinate (Xp,Yp) of the punch setting position is, for example, a middle position between center coordinates of each of two closed areas P1 and P2 specified with the touch pen.

Moreover, as illustrated in S33, the coordinate (Xs, Ys) of the staple setting position is, for example, a middle position between both ends of the track specified with the touch pen.

A set coordinate of a document arrangement position in the N in 1 process is, for example as shown in FIG. 6, in the case of a document icon A, a center coordinate (Xa,Ya) of the document icon A, and is, in the case of a document icon B, a center coordinate (Xb,Yb) of the document icon B.

Figure 7:
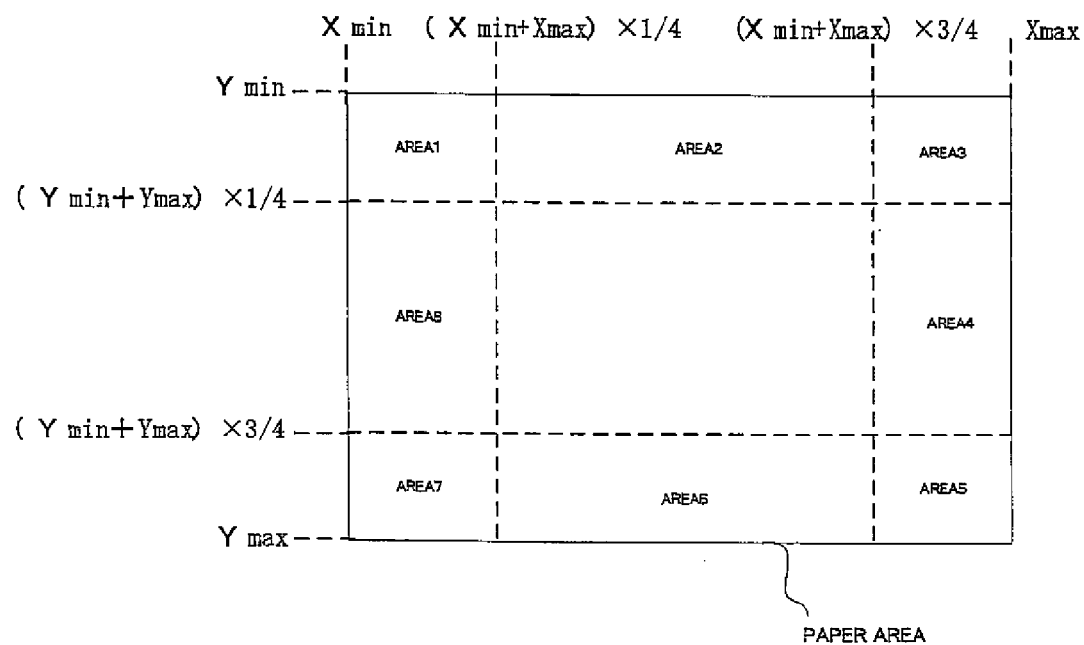
FIG. 7 is a view showing an example of coordinate areas where setting of a punching position and a stapling position is possible in a paper area in the image forming apparatus according to the present invention.

FIG. 7 is a view showing an example of coordinate areas (areas 1 to S) where setting of a punching position and a stapling position is possible in a paper area.

At S19 in FIG. 5, of coordinates in the closed area, a minimum coordinate (Xmin,Ymin) and a maximum coordinate (Xmax,Ymax) are set as a paper area.

In the paper area, for example, the X coordinate is divided into three by Xmin, (Xmin+Xmax)×¼, (Xmin+Xmax)×¾, and Xmax. In addition, the Y coordinate is divided into three by Ymin, (Ymin+Ymax)×¼, (Ymin+Ymax)×¾, and Ymax. For example, an area encircled by four coordinates; (Xmin, Ymin), ((Xmin,(Ymin+Ymax)×¼)), ((Xmin+Xmax)×¼, Ymin)), and ((Xmin+Xmax)×¼, (Ymin+Ymax)×¼)) is set as an area 1.

Moreover, as shown in FIG. 7, based on in which areas (areas 1 to 8) the punch coordinate (Xp,Yp), the staple coordinate (Xs,Ys), and the like specified in the paper area are positioned, the main control portion 101 performs determination as to whether or not finishing setting is possible and setting of directions of images and sheets with reference to the output conditions table, which will be described below.

Figure 8:
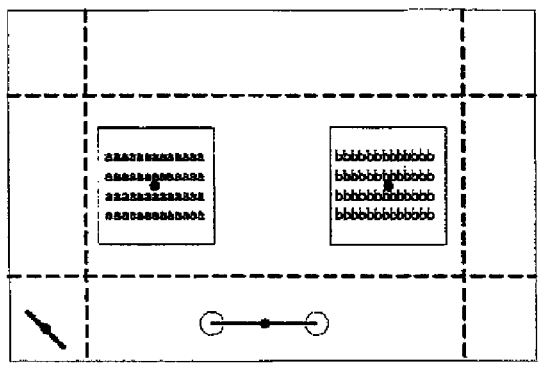
FIG. 8 is a view showing an example of a punching position and a stapling position that can be set in a paper area in the image forming apparatus according to the present invention.
Figure 8:
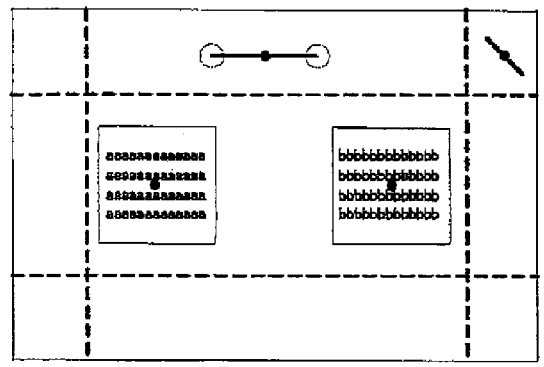
Figure 8:
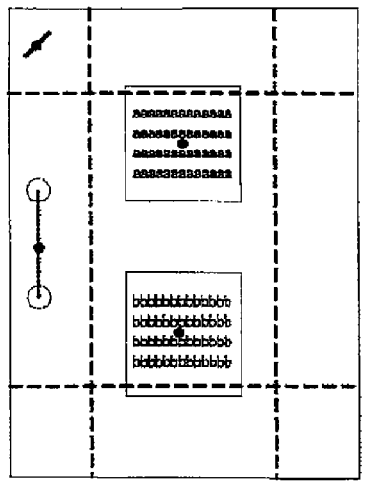
Figure 8:
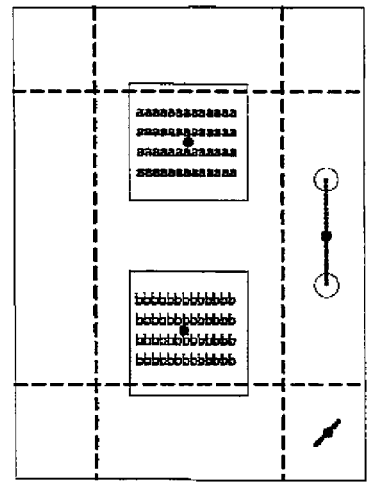
Figure 9:
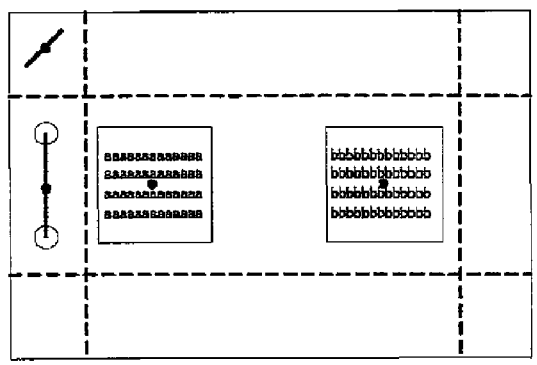
FIG. 9 is a view showing an example of a punching position and a stapling position that can be set in a paper area in the image forming apparatus according to the present invention.
Figure 9:
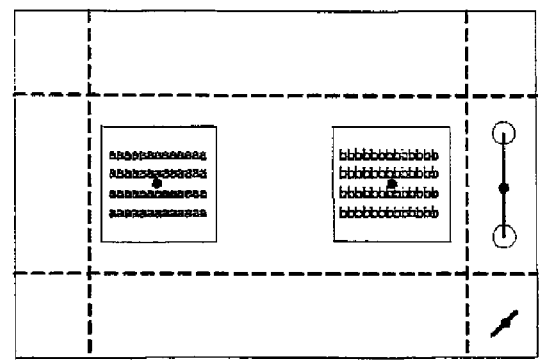
Figure 9:
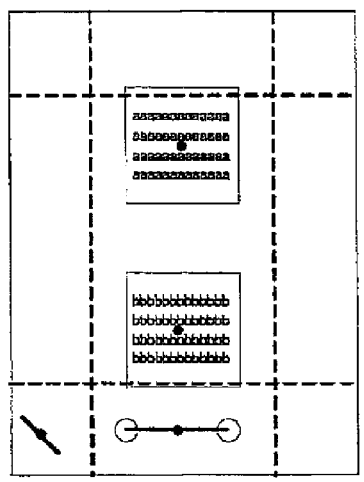
Figure 9:
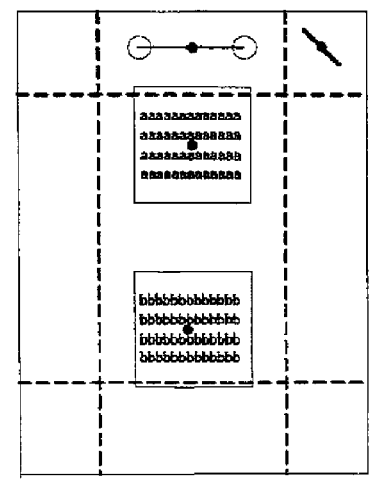

FIGS. 8 and 9 show examples of punching positions and stapling positions that can be set in a paper area.

FIG. 10 shows an example of the aforementioned output conditions table stored in the storage portion 111.

Numbers applied in FIGS. 8 and 9 (described above each paper area) correspond to items in the left side of "output conditions" of the table in FIG. 10.

The output conditions table is referred to by the main control portion 101 depending on that in which areas in the paper area shown in FIG. 7 the punching position (Xp,Yp) and the stapling position (Xs,Ys), that are input conditions, are included, and that whether the paper area is input in a laterally long state or in a vertically long state, to determine whether or not finishing setting is possible. When the finishing setting is possible, the output conditions table is further referred to and used in order to output data of a paper feeding direction and an image rotating direction to the image formation control portion 105 and the post-process control portion 106.

Whether the paper area is input in a laterally long state or in a vertically long state can be determined such that, for example as shown in FIG. 10, values obtained by (Xmin−Xmax) and (Ymin−Ymax) are compared, when the value of (Xmin−Xmax) is greater, it is determined as the laterally long state, and when the value of (Ymin−Ymax) is greater, it is determined as the vertically long state.

As shown in FIGS. 8 and 9, in the present embodiment, since punching and stapling can be set only on a same edge side of a recording paper, it is necessary that process positions of punching and stapling are always set on the same side also in the output conditions table. Since the input conditions of the output conditions table do not prescribe input that is not set in the same side, in such a case, error display is performed like at S44 of FIG. 5.

As described above, by providing the output conditions table for reference of finishing conditions setting, when setting conditions of hole punching and stapling, determination of possibility thereof can be performed.

[Setting in N in 1 Process]

The setting in N in 1 at S20 and S21 of FIG. 5 will hereinafter be described in detail.

FIG. 11 is a view showing an example of setting in N in 1.

As shown in the figure, a paper area is divided in accordance with the number of document icons included in the paper area to perform setting of areas where document images are arranged. Examples of setting are shown as follows; 2 in 1 in FIGS. 11A and 11B, 3 in 1 in FIGS. 11C and 11D, 4 in 1 in FIG. 11E, and 5 in 1 or 6 in 1 in FIG. 11F.

For example, when the number of document icons included in the paper area is two, it is set as 2 in 1, thus the paper area is divided vertically or laterally into an area A and an area B.

The main control portion 101 performs determination firstly as to the case of lateral division, for example as shown in FIG. 11A.

The main control portion 101 determines in which areas of areas A and B center coordinates (Xa,Ya) and (Xb,Yb) of two document icons are included and sets a position of a document image at the area A or the area B.

When the center coordinates (Xa,Ya) and (Xb,Yb) of the document icons are included in a same area, the main control portion 101 makes setting in the lateral division (FIG. 11A) invalid. When the setting is made invalid, the main control portion 101 then performs determination as to the vertical division (FIG. 11B) to determine in which areas the center coordinates (Xa,Ya) and (Xb,Yb) of the document icons are included. When being included in a same area, the setting is made invalid similarly to in the case of the lateral division.

In this way, the main control portion 101 performs determination, thus making it possible to recognize whether document images are arranged vertically or laterally and perform setting of positions of document images in N in 1 in accordance with their arrangement.

In the case of 3 in 1 with three document images, as shown in FIGS. 11C and 11D, determination is performed for areas A, B, and C, in the case of 4 in 1, as shown in FIG. 11E, determination is performed for areas A, B, C, and D, and in the cases of 5 in 1 and 6 in 1, as shown in FIG. 11F, determination is performed for areas A, B, C, D, E, and F, similarly.

With the configuration as described above, it is possible that a user specifies a process in N in 1 with an intuitive operation by the touch pen and the like.

Note that, the image forming apparatus of the present invention is not limited only to aforementioned illustrative examples and alternations can certainly be made within the scope of the present invention.

What is claimed is:

1. An image forming apparatus, comprising:
    an image data acquiring portion that acquires image data;
    a display portion that displays the image data in a thumbnail form as a document icon;
    an operation receiving portion that receives operation input for process conditions about a finishing process;
    a storage portion that stores the image data and data of the process conditions; and
    a control portion that performs control for the finishing process involving output of the image data, wherein
    the operation receiving portion is provided on a display surface of the display portion to receive the operation input such that a user's physical engagement on the display surface of the display portion generates input information, and
    the control portion causes the display portion to display the document icon, and performs setting for the process conditions by the input information acquired from the operation receiving portion based on a size, shape, and position of each operation input resulting from the user's physical engagement on the display surface,
    wherein
    input information acquired from the operation receiving portion is coordinate information of a continuous track, and
    the control portion performs determination as to whether or not the track forms a closed area, and in a case where determination result shows the closed area, when the closed area includes a display area corresponding to the document icon, the coordinate information is set in the storage portion as information for specifying a paper area, wherein the control portion performs determination as to whether or not the track forms a closed area, in a case where determination result shows the closed area, when the closed area includes no display area of the document icon and when the closed area has a size smaller than a predetermined size, the coordinate information is set in the storage portion as information for specifying a position of a punching process, and wherein the control portion performs determination as to whether or not the track forms a closed area, in a case where determination result does not show the closed area, when the track has a length shorter than a predetermined length, the coordinate information is set in the storage portion as information for specifying a position of a stapling process.

2. The image forming apparatus according to claim 1, wherein the control portion stores, in the storage portion, identification information of the document icon within the paper area, the number and a position of the document icon, as processing conditions of the finishing process for synthesizing and printing a plurality of the image data on a recording paper.

3. The image forming apparatus according to claim 2, wherein the control portion divides the paper area into the number of the document icon, and when each divided paper area is provided with the document icon correspondingly, arrangement of the image data in the paper area is decided and set so as to be in the divided paper area.

4. The image forming apparatus according to claim 1, wherein the display portion is provided with a touch panel as the operation receiving portion, the touch panel includes:

a document icon area for displaying the acquired image data as a thumbnail; and an output image operation area for displaying the document icon dragged and dropped from the document icon area and receiving operation input with a touch pen, and the control portion identifies a coordinate by handwriting input on the output image operation area to set the process conditions.

5. The image forming apparatus according to claim 1, wherein the control portion performs determination as to whether or not the track forms a closed area, in a case where determination result shows the closed area, when the closed area includes no display area of the document icon and when the closed area has a size smaller than a predetermined size, the coordinate information is set in the storage portion as information for specifying a position of a punching process, and in a case where determination result does not show the closed area, when the track has a length shorter than a predetermined length, the coordinate information is set in the storage portion as information for specifying a position of a stapling process, the display portion is provided with a touch panel as the operation receiving portion, the touch panel includes:

a document icon area for displaying the acquired image data as a thumbnail; and an output image operation area for displaying the document icon dragged and dropped from the document icon area and receiving operation input with a touch pen;

the control portion identifies a coordinate by handwriting input on the output image operation area to set the process conditions, the storage portion includes a conditions setting table for verifying the process conditions, and the control portion, when setting of the punching process and/or the stapling process is performed, determines whether or not setting of the process conditions is possible, by referring to the conditions setting table with respect to a position coordinate of the punching process and/or a position coordinate of the stapling process.

6. The image forming apparatus according to claim 5, comprising:

an image forming portion for obtaining input of the image data to perform printing of an image; and a post-processing portion for performing a post process on a printed recording paper, wherein the conditions setting table sets a direction of the image data corresponding to the position of the punching process and the position of the stapling process and a feeding direction of the recording paper, and the control portion obtains data of the process conditions from the storage portion, outputs, to the image forming portion, information of the image data to be arranged on the recording paper and information of the direction of the image data and the feeding direction of the recording paper, and outputs, to the post-processing portion, information of the punching process and/or the stapling process, and thereby performs control of the finishing process.

7. The image forming apparatus according to claim 4, wherein the display portion includes a setting confirmation area for displaying setting information, and the setting confirmation area displays contents of setting for the process conditions received from the operation receiving portion as a message.

8. The image forming apparatus according to claim 5, wherein the display portion includes a setting confirmation area for displaying setting information, and the setting confirmation area displays contents of setting for the process conditions received from the operation receiving portion as a message.

* * * * *